April 29, 1941.    A. HOLLANDER ET AL    2,239,715
PUMPING APPARATUS
Filed March 21, 1938    6 Sheets-Sheet 1

Inventors
Aladar Hollander
Waldemar F. Mayer

By Lyon & Lyon
Attorneys

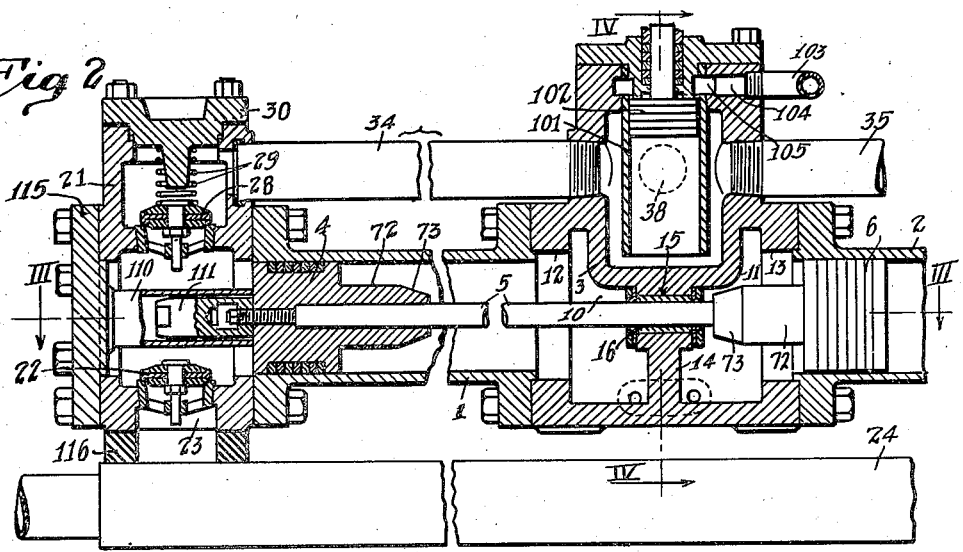
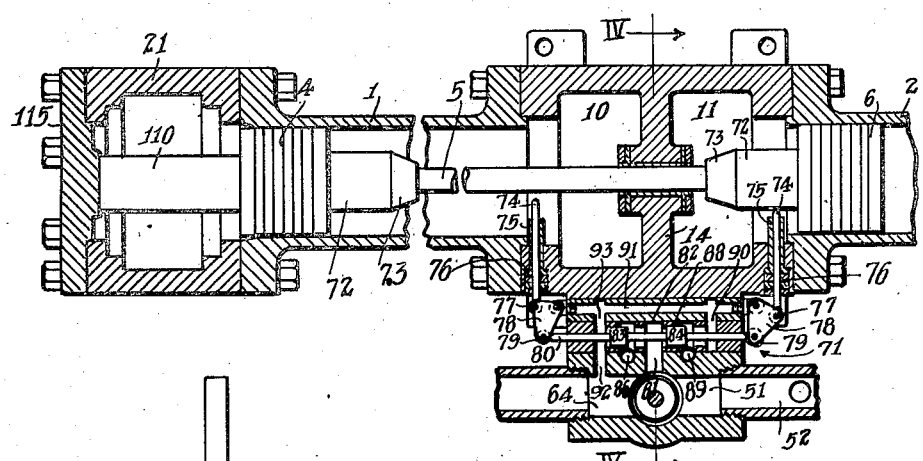
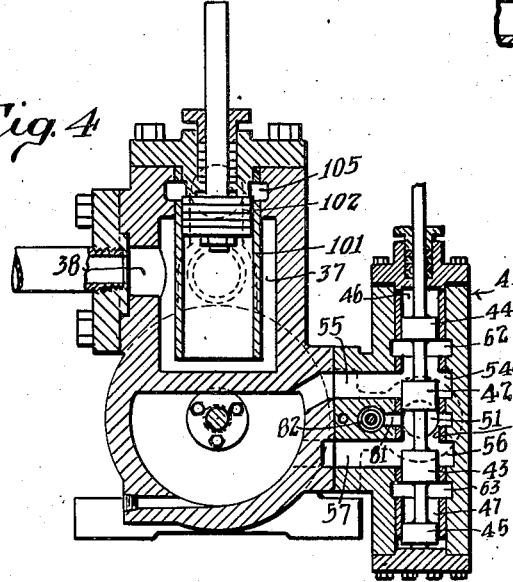

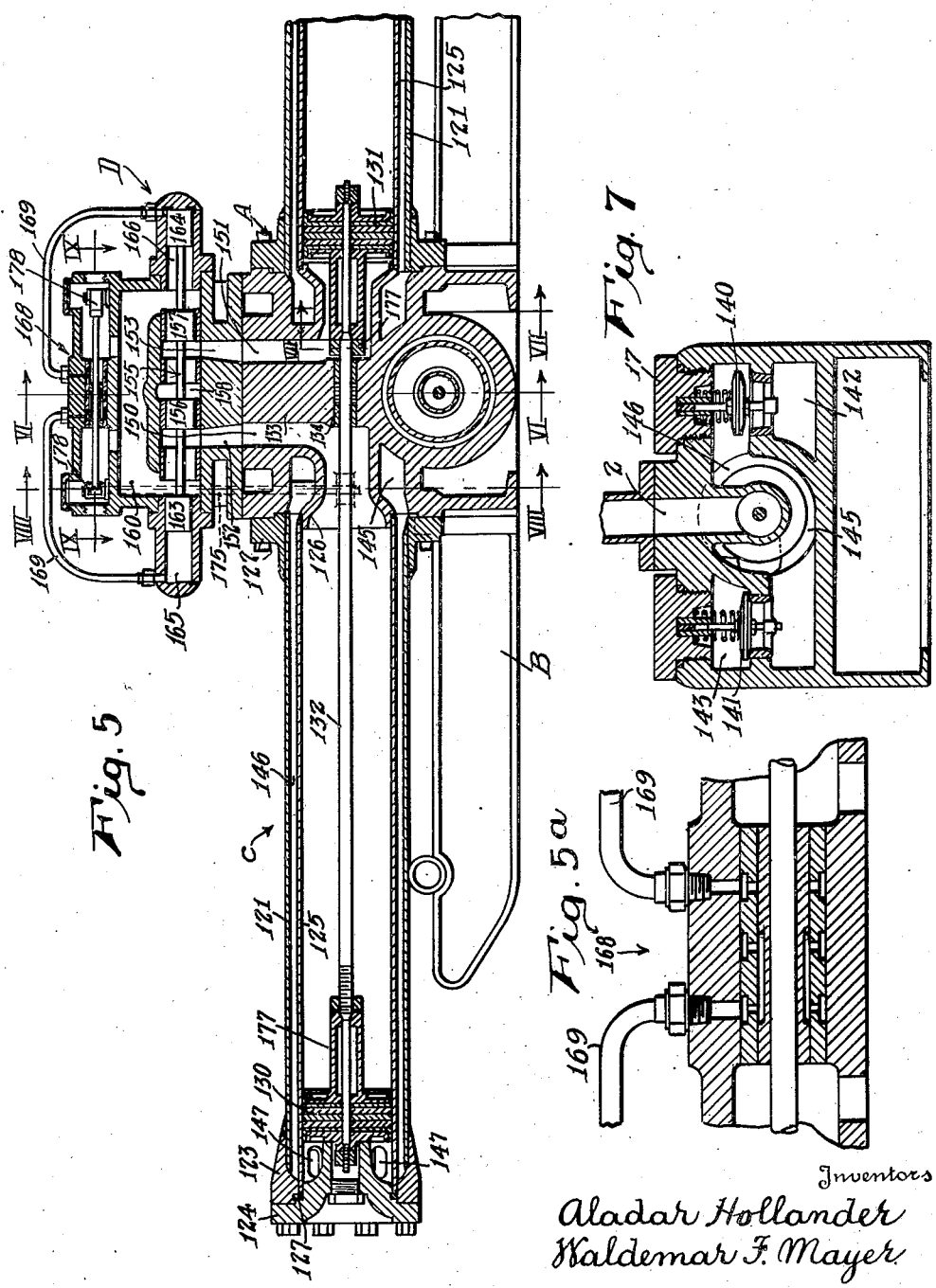

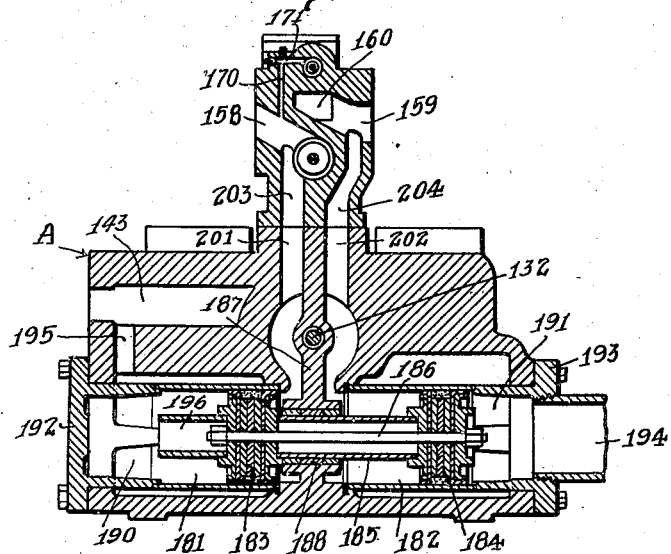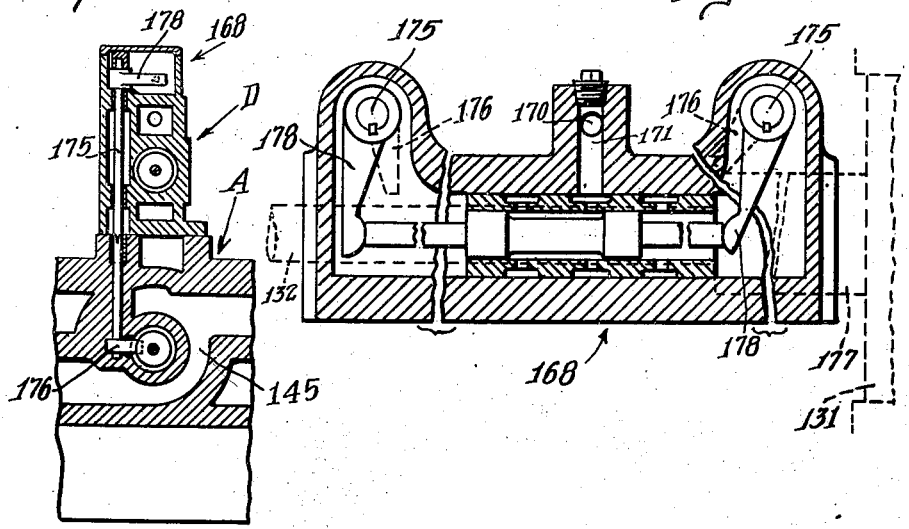

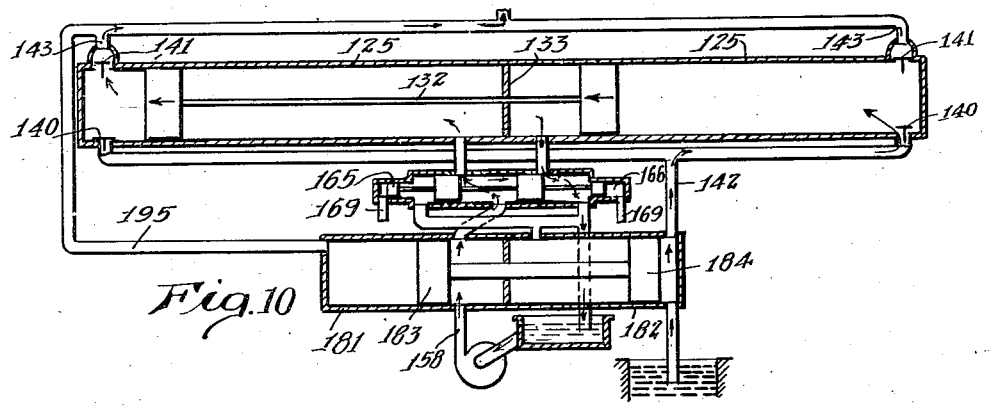
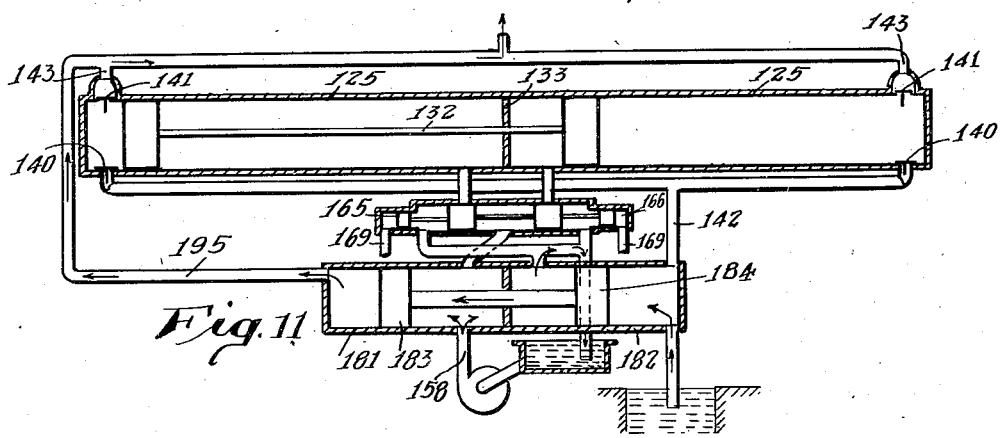
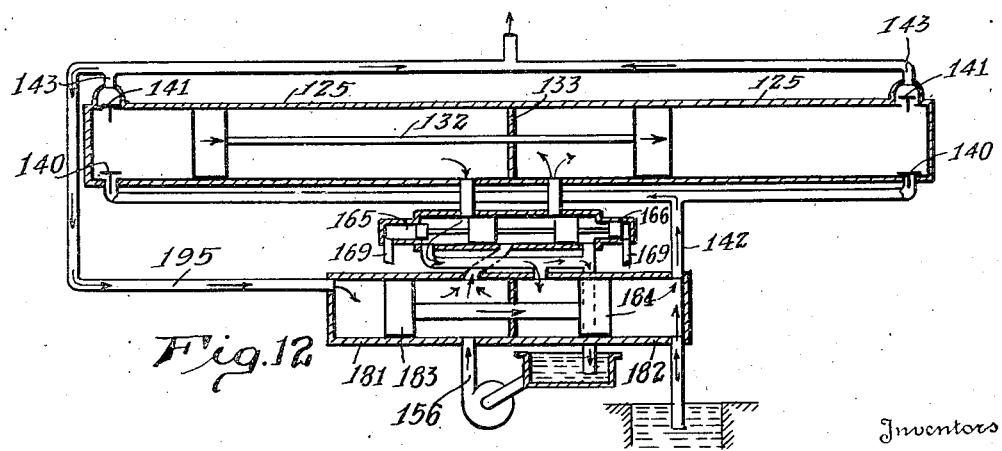

April 29, 1941.  A. HOLLANDER ET AL  2,239,715
PUMPING APPARATUS
Filed March 21, 1938    6 Sheets-Sheet 6

Inventors
Aladar Hollander
Waldemar F. Mayer
By Lyon & Lyon
Attorneys

Patented Apr. 29, 1941

2,239,715

UNITED STATES PATENT OFFICE 2,239,715

PUMPING APPARATUS

Aladar Hollander and Waldemar F. Mayer, Los Angeles, Calif., assignors to Byron Jackson Co., Huntington Park, Calif., a corporation of Delaware Application March 21, 1938, Serial No. 197,140

15 Claims. (Cl. 197—52)

This invention relates generally to hydraulically actuated piston pumps, and particularly to simplex pumps adapted to handle liquids at high pressure.

In the copending application of Aladar Hollander, for Pumping apparatus, Serial No. 197,139, filed concurrently herewith, patented January 23, 1940, No. 2,187,972, there is set forth in detail the problems encountered in pumping drilling mud in connection with drilling deep wells, and the objections to the pumps now employed in this service. There is also described therein a hydraulic mud pumping system particularly adapted to this service and incorporating a novel pump designed to overcome the defects of pumps now in use. Generally speaking, the system comprises a prime mover, a centrifugal pump driven thereby and handling a clear power or motive liquid, and a simplex hydraulic pump actuated by the motive liquid for pumping drilling mud. The hydraulic pump disclosed in the aforementioned application is of the simplex, double-acting, balanced piston type, comprising a pair of interconnected pistons reciprocable in cylinders by the motive liquid. The motive liquid is admitted to the cylinders on one side of the respective pistons, and the mud being pumped fills the cylinders on the other side of the pistons. A distinctive feature of this pump is the substantial equalization of pressures on opposite sides of the pistons, with the motive liquid pressure only slightly higher than the mud pressure. This is in striking contrast to pressure conditions in pumps of the types in general use, wherein the pressure differential across the pistons is the full discharge pressure.

A defect of a simple, hydraulically-actuated simplex pump is that the flow of the pumped and motive liquids is intermittent due to the fact that the pistons necessarily come to rest momentarily at the end of each stroke and the motive liquid is temporarily cut-off during the reversal of the valve mechanism. In accordance with the invention in the aforementioned Hollander application, this problem has been solved with respect to the flow of motive liquid into the pump and the discharge of pumped fluid from the pump by a floating piston arrangement in conjunction with a special valve construction, whereby the reversals of the two pistons are slightly out of phase with each other.

An object of the present invention is to attain substantially continuous or pulseless discharge of pumped liquid and intake of motive liquid in a hydraulically actuated simplex pump without employing floating main pistons.

Another object is to attain, in a pump of the type referred to, substantially continuous or pulseless flows of pump liquid into the pump and motive liquid from the pump as well as pulseless discharge of pumped liquid and pulseless intake of motive liquid.

Another object is to reduce pulses in liquid flow in a pump of the type described with an auxiliary mechanism other than the pump pistons and cylinders themselves, in which the mechanism is responsive to pressure drop in the discharge line of the pumped liquid.

The aforementioned objects are attained in accordance with the present invention by the use of surge pistons which are brought into action automatically during reversal of the main pistons, the surge pistons being actuated by the motive liquid during reversal of the main pistons to provide the continuous flow of motive liquid into the pump and continuous discharge of pumped liquid from the pump, and also continuous flow of pump liquid into the pump and continuous discharge of motive liquid from the pump.

A feature of the invention is an auxiliary mechanism for reducing pulses in liquid flow in a hydraulically actuated simplex pump incorporating a surge cylinder and piston therein in which the piston is exposed on opposite sides to motive liquid and to pump liquid and the pressure of the motive liquid is always greater than that of the pump liquid, to prevent contamination of the motive liquid with the pump liquid.

Other more specific objects and features of the invention will become apparent from the following description, taken in conjunction with the accompanying drawings, of certain particular embodiments of the invention.

In the drawings:

Fig. 2 is a vertical longitudinal section taken centrally through a pump of the form shown schematically in Fig. 1;

Fig. 3 is a horizontal longitudinal section taken substantially on line III—III of Fig. 2;

Fig. 4 is a transverse sectional view taken substantially on line IV—IV of Figs. 2 and 3;

Fig. 5 is a central longitudinal vertical section of a modified form of the invention embodying a double surge piston;

Fig. 5a is an enlarged detail section, similar to Fig. 5, but showing only the pilot valve;

Fig. 6 is a transverse vertical section taken on line VI—VI of Fig. 5;

Fig. 7 is a transverse vertical section taken on line VII—VII of Fig. 5;

Fig. 8 is a transverse vertical section taken on line VIII—VIII of Fig. 5;

Fig. 9 is a horizontal section taken on line IX—IX of Fig. 5;

Figs. 10, 11 and 12 illustrate diagrammatically three stages of operation of the double surge piston during reversal of the main valve, in the form of the invention shown in Figs. 5 to 9;

Figure 1:
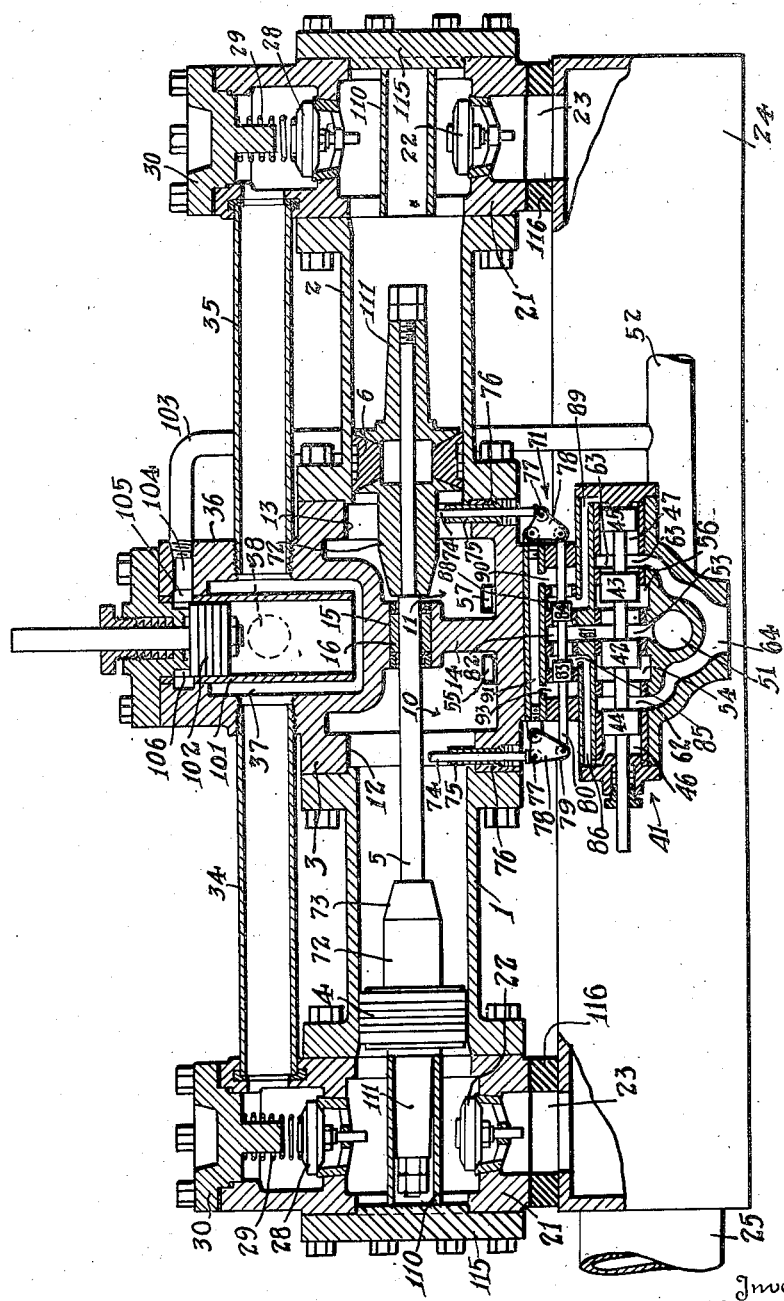
Fig. 1 is a schematic assembly of one form of the invention, employing a single surge piston.

Referring to the form of the invention shown in Figs. 1 to 4, it is to be understood that whereas Figs. 2, 3 and 4 disclose the actual pump structure with parts shown in their proper physical relationship, Fig. 1 on the other hand is more or less schematic. In this figure (Fig. 1) sections taken through essential parts of the pump in different angularly related planes have been projected on a single plane in order to facilitate explanation. For instance, as shown in Figs. 3 and 4, the pilot valve assembly 71 has its axis lying in a central horizontal plane through the main cylinder rather than vertically below the central body 3, as shown schematically in Fig. 1. Also, the main reversing valve assembly 41 is disposed vertically alongside the central body 3, as shown in Fig. 4. The upper end has been rotated to the left to project it into the position shown in Fig. 1. Otherwise, Fig. 1 corresponds to Figs. 2, 3 and 4.

Referring to these figures, the pump comprises generally a pair of cylinders 1 and 2 secured to opposite sides of a central body 3. Within cylinder 1 is a piston 4 secured to one end of a piston rod 5 which extends through the central body 3 and into cylinder 2. A second piston 6 is secured to the other end of the piston rod, the spacing of the pistons on the rod conforming to the distance between corresponding ends of the cylinders whereby the pistons are reciprocable in unison in their respective cylinders.

The central body member 3 is preferably a casting, and is cored on opposite sides to form chambers 10 and 11 communicating respectively with the cylinders 1 and 2, the chambers terminating in openings 12 and 13 coaxial with the cylinders. The chambers 10 and 11 are separated by a partition 14 provided with an opening 15 through which the piston rod 5 reciprocates. The piston rod is maintained in fluid tight relation to the partition by means of a suitable stuffing box 16, permitting reciprocation of the piston but preventing leakage of fluid between the chambers.

A valve chamber 21 is secured to the outer end of each cylinder 1 and 2, each valve chamber housing a pair of check valves. A pair of lower inwardly opening valves 22, 22 communicate through passages 23, 23 with a hollow box structure (Fig. 1) which serves as a base for the pump and functions also as a mud suction reservoir. A mud inlet 25 at the left end of the box communicates with a source of mud, such as the usual mud pit. On the inward stroke of each piston 4 or 6, the respective valve 22 will be lifted from its seat to admit mud to the cylinder on the outer side of the piston.

A pair of outwardly opening check valves 28, 28 are mounted in the valve chambers 21, these valves being urged toward their seats by springs 29 interposed between the valves and closure plates 30. The valves 28 control communication between the cylinders 1 and 2 and a pair of discharge pipes 34 and 35 leading from the valve chambers 21 to a common housing 36. The pipes 34 and 35 are in open communication with a surge chamber 37 formed within the housing 36, and a discharge pipe 38 leads from the surge chamber to the destination of the discharge mud. Upon outward movement of each piston 4 or 6, the respective outlet valve 28 is lifted and mud is forced through pipe 34 or 35 to the surge chamber 37 and through outlet 38 to the point of use.

In order to reciprocate the pistons 4 and 6 in their respective cylinders, a motive liquid under pressure is alternately admitted to the cylinders on the inner sides of the pistons. The motive liquid may be derived from any suitable source, providing a steady flow at steady pressure. A centrifugal pump is a preferred source.

The admission of pressure liquid to the cylinders is controlled by a main reversing valve assembly, indicated generally at 41 (Figs. 1 and 4). The valve assembly comprises a pair of balanced main valves 42 and 43 mounted on a common valve stem. Also secured to the valve stem at opposite ends of the valve stem are shuttle pistons 44 and 45 reciprocable in cylinders 46 and 47. Upon admission of pressure liquid to the cylinder 46 or 47 on the outer side of the respective piston, the main valves will be shifted accordingly. A pressure liquid inlet 51 is in communication with the source of pressure liquid through an inlet pipe 52, and is constantly open to the chamber 53 between the valves 42 and 43. Valve 42 controls communication between chamber 53 and a chamber 54 communicating through a passage 55 with the chamber 10 in the central body 3. Valve 43 controls communication between chamber 53 and a chamber 56 communicating through a passage 57 with the other chamber 11 in the central body 3. The valves are so spaced with respect to the chambers 54 and 56 that when one is open to communication with the central chamber 53 the other is closed.

Valve 42 also controls communication between chamber 54 and an exhaust passage 62, and valve 43 also controls communication between chamber 56 and an exhaust passage 63, the exhaust passages 62 and 63 merging into a common discharge outlet 64. In the position of the valves shown in Figs. 1 and 4, pressure liquid is being admitted by valves 43 to chamber 56 and through passage 57 to chamber 11, and thence to the right hand cylinder 2 to act on piston 6 and move it outwardly. Valve 43 also cuts off the discharge passage 63 at this time. Valve 42 has closed communication between central chamber 53 and chamber 54, the latter being open to the discharge passage 62 to permit movement of piston 6 to the right to cause piston 4 to force spent motive liquid from the inner side of cylinder 1 back to the source. It will be understood that movement of piston 6 to the right also forces pumped liquid out of the cylinder 2, through the upper valve 28 (lower valve 22 being closed), through pipe 35 to the surge chamber 37, and thence out through the discharge outlet 38.

When the main valves are shifted to the left in Fig. 1, or upwardly in Fig. 4, pressure liquid is admitted by valve 42 to chamber 54 and through passage 55 to chamber 18 and thence to the left hand cylinder 1 to move piston 4 to the left. At the same time, pressure liquid is cut off from chamber 56 by valve 43, the latter establishing communication between cylinder 2 and discharge passage 63.

In order to actuate the main reversing valve at the end of each stroke of the main piston, a pilot valve assembly, generally indicated at 71, is employed. Each of the pistons 4 and 6 is provided on its inner side with a tubular extension 72 terminating in a tapered cam surface 73. As each piston approaches the inner end of its cylinder, the respective cam surface 73 engages one of two plungers 74, 74 projecting transversely through the wall of the central body 3 into the path of the cams. The plungers 74 are reciprocable in guide sleeves 75, and are sealed to the central body by suitable packing glands 76. The outer ends of the plungers engage rollers 77 journaled on bell crank levers 78 pivotally mounted on the valve housing. Rollers 79 also journaled on the bell crank levers 78 engage opposite ends of a pilot valve stem 80. Thus it will be seen that upon engagement of one of the plungers 74 by its respective cam 73 the pilot valve stem will be shifted in one direction or the other, the other plunger being thereby moved inwardly into the path of its cam for engagement thereby at the end of the next stroke.

The central pressure liquid chamber 53 in the main valve assembly is extended inwardly at 81 to a central chamber 82 in the pilot valve assembly. A pair of pilot valves 83 and 84 on the pilot valve stem 80 control communication between the central chamber 82 and the outer ends of the cylinders 46 and 47 in the main valve assembly. Valve 83 controls port 85 leading to passage 86 and cylinder 46, while valve 84 controls port 88 leading to passage 89 and cylinder 47. In the position shown in Fig. 1, the pilot valve is shifted to the left, and pressure liquid is admitted to passage 86 and cylinder 46 to move and retain the main valve in the right hand position. At the same time, the right hand pilot valve 84 establishes communication between passage 89 and a venting chamber 90 opening to a bore 91 communicating with the water outlet through a passage 92 (Fig. 3). A similar venting chamber 93 is provided to the left of pilot valve 83, for venting cylinder 46 when the main valve is shifted to the left.

From the foregoing description, the operation of the pilot valve and the main reversing valve will be understood. Motive liquid is alternately admitted to the cylinders 1 and 2 on the inner sides of the pistons 4 and 6. It will be understood that with the motive liquid acting directly on the pistons, the piston speed will depend on the back pressure of the mud, the pistons tending to equalize the pressures on opposite sides thereof. If the motive liquid is supplied by a centrifugal pump, the pressure or head developed is dependent on the volume of liquid displaced, and consequently at the high pressures required in pumping drilling mud the piston speed will be relatively slow. In any event, the pressure differential across the pistons will be low, in the neighborhood of 20 or 30 lbs./sq. in. The slight excess of motive liquid pressure over mud pressure is not only desirable in order to prevent leakage of mud across the pistons into the clear motive liquid, but is made necessary by the fact that the piston area on the motive liquid side is less than that on the mud side by an amount equal to the cross section area of the piston rod.

As was pointed out in the introductory remarks, it is necessary to avoid interruption of flow of motive liquid and of discharge mud during reversal of the stroke of the main pistons. (In a duplex, double-acting pump this can be effected by properly overlapping the strokes of the pistons. However, inasmuch as our pump is in effect of the single cylinder or simplex, double-acting type, special provision must be made for accomplishing this result.) Various arrangements for smoothing out pressure fluctuations in a pump discharge have been devised, such as air bells and accumulators. So far as is known, however, no such arrangement has been provided wherein the motivating force is a liquid used as motive liquid for operating the pump. At the prevailing pressure encountered in pumping drilling mud, an air accumulator would necessarily be so large, because of the compressibility of air, that it would be out of the question. Furthermore, the pressure-volume characteristics of air at such high pressures are not such as to provide for uniform flow of liquid with an air accumulator.

In the form of our invention shown in Figs. 1 to 4, a single surge piston is provided to insure continuous flow of discharge mud and of motive liquid. As shown in Figs. 1 and 4, a surge cylinder 101 is mounted within the surge chamber 37 with its lower end open so as to expose the outer side of a piston 102 to the discharge mud pressure. The inner side of the piston is exposed to the pressure of the motive liquid which is admitted to the surge cylinder through a branch pipe 103 connected to the main inlet pipe 52. A bore 104 in the housing 36 connects pipe 103 with an annular passage 105 surrounding a portion of the surge cylinder provided with ports 106.

As stated previously, the unit pressure of the motive liquid is slightly higher than that of the discharge mud, and in order that the piston be retained in its retracted position, as shown, except during reversal of the main pistons, the piston area on the motive liquid side of the surge piston 102 is made somewhat less in proportion to the mud side thereof, than is the case with the main pistons. Consequently, it requires a decrease in mud pressure or an increase in motive liquid pressure to cause the surge piston to move toward the open end of its cylinder. With the proportional piston areas shown, a drop of approximately 20% in the discharge mud pressure is required to cause the surge piston to operate.

In order to produce a gradual deceleration of the main pistons at the end of each stroke, and a gradual rather than a sudden drop in mud pressure, a dashpot 110 is provided in the mud valve chamber formed on the outer side of each piston 4 and 6, and, as shown at the left end of Figs. 1 and 2, the extensions 111 are adapted to project within the dashpots 110 with gradually diminishing clearance at the end of each outward stroke, to retard the movement of the pistons gradually. This causes a gradual reduction in discharge mud pressure, and, when the latter is reduced to the point where the total motive liquid pressure acting on surge piston 102 exceeds the total discharge mud pressure, the surge piston will move toward the open end of its cylinder and displace the mud therein, thereby continuing the discharge of mud while the main pistons momentarily come to rest and reverse their direction of travel. The movement of the surge piston also permits motive liquid to flow into the surge cylinder during the short interval when it is cut off from the main cylinders while the main reversing valve is passing over dead center. In this way water hammer in the motive liquid is avoided.

After the main valve reverses and the main pistons start moving in the opposite direction, the discharge mud pressure gradually rises and causes the surge piston to return to its retracted position.

From the foregoing, it is apparent that a surge piston arrangement has been provided which is positive in its action in providing continued flow of motive liquid as well as of discharge mud during the reversing interval when the flow of these liquids would otherwise be momentarily discontinued.

From the manufacturing and installation standpoint, this form of our pump has many advantages. It will be noted that the mud valves 22 and 23 in the valve chamber 21 are so disposed that the valve seats are outside the radial limits of the pistons. Hence by removing the valve covers 30 and lifting out the valves, ample clearance is provided for removing the main pistons through the ends of the valve chambers. The end plates 115 are made removable for this purpose, and it will be noted that the dashpots 110 are secured to the end plates 115 to be removable therewith.

The hollow base 24 serving the double function of pump base and suction reservoir cuts down the total weight of the pump and eliminates considerable piping and pipe fittings. Rubber gaskets 116 interposed between the valve chambers 21 and the base 24 provide a fluid-tight connection between these elements and also a resilient mounting for the outer ends of the cylinders. With the cylinders bolted at their inner ends to the central body 3, the weight of the cylinders maintains a tight seal at 116 without the necessity of bolting the valve chambers to the base.

In Figs. 5 to 9 we have shown in detail a modified form of our invention, the operation of which is illustrated schematically in Figs. 10 to 12. This form embodies all of the basic features of the form previously described, with several additional advantageous features. Generally speaking, these involve: (a) the incorporation of the mud valves in the central body member in tead of at the outer end of the main pistons; (b) the provision of an outer cylinder surrounding each main cylinder and forming an annular mud passage; and (c) the provision of a double surge piston whereby not only is there continuous flow of pressure liquid and discharge mud, but continuous flow of suction mud and of spent motive liquid is also maintained during reversal of the main pistons.

Referring to Figs. 5 to 9 wherein this form of pump is disclosed in detail, the pump comprises generally a central body A mounted on skids B; a pair of outer cylinders C, C are bolted or otherwise secured in coaxial relation to opposite sides of the central body A, and a valve assembly generally indicated at D is secured to the top of the central body.

Each cylinder C comprises an elongated casing 121 having bolting flanges 122 and 123 welded to opposite ends thereof. The flange 122 is bolted to the central body A, and an end cover plate 124 is bolted to the flange 123 to form a cylinder closed at its outer end. Mounted within each cylinder casing 121 in spaced concentric relation thereto is an inner cylinder 125, constituting the main pumping cylinders. In order to properly position the cylinder 125, an annular flange 126 is formed on the central body member, the cylinder 125 fitting snugly over this flange and seating against a shoulder at the base of the flange. The outer end of the cylinder 125 is retained between the inner surface of the bolting flange 123 and a complementary surface on the end cover plate 124, a gasket ring 127 being interposed between the flange and closure plate to seal the joint therebetween.

Pistons 130 and 131 are reciprocable in the cylinders 125, being connected by a piston rod 132 extending through a partition 133 in the central body. A stuffing box 134 in the partition prevents leakage between opposite sides of the central body.

As stated previously, the mud suction and discharge valves are mounted within the central body in this form of the invention. A suction valve 140 and a discharge valve 141 (Fig. 7) is provided for each main cylinder, one pair being disposed on each side of a central transverse plane represented by line VI—VI of Fig. 5. Both suction valves 140 communicate on their intake side with a common suction chamber 142, and the discharge side of both discharge valves 141 communicates with a common discharge chamber 143. The suction and discharge chambers are connected to mud inlet and outlet openings respectively connected to a mud source and to the point of discharge.

As shown in Fig. 7, the discharge side of each suction valve and the inlet side of the corresponding discharge valve are in communication with an annular passage 145 which merges with the annular space between the inner and outer cylinders 125 and 121. The construction shown in Fig. 7 provides valve controlled intake and discharge of mud to and from the right-hand cylinder, a similar arrangement being provided to the left of the center of the central body, for the left-hand cylinder.

As will be seen at the extreme left of Fig. 5, communication is established between the outer end of each inner cylinder 125 and the annular space 146 between the cylinders by the provision of a peripheral series of ports 147 at the extreme outer end of cylinder 125.

It will thus be seen that on the suction stroke mud will be drawn from chamber 142 through valve 140 into annular space 145 in the central body, thence through the annular space 146 between the cylinders, through ports 147 and into the inner cylinder. On the pressure stroke the discharge mud will follow the same path in the reverse direction to annular passage 145, thence through discharge valve 141 to discharge chamber 143 and to the destination.

The valve assembly D is secured in fluid-tight relation to the top of the central body A, each of these members being provided with four registering channels spaced around the central vertical axis of the central body. A pair of channels 150 and 151 (Fig. 5) communicate respectively at their lower ends with the inner cylinders 125 on the inner side of the pistons 130 and 131, and at their upper ends with registering channels 152 and 153 in the valve body D. Motive liquid under pressure is alternately admitted to and exhausted from the main cylinders through channels 150, 152 and 151, 153, the admission and exhaust thereof being controlled by a main reversing valve 155. This valve, and the pilot valve by which it is controlled, are generally similar to that shown and described in connection with the form shown in Figs. 1 to 4, and hence will be only briefly described. A pair of main reversing valves 156 and 157 control the flow of pressure liquid from a central inlet port 158 (Fig. 6) alternately to channels 152 and 153, one of these channels being open to the inlet port while the other is in communication with an exhaust port 159 (Fig. 6) through a channel 160. Shuttle pistons 163 and 164 connected to the reversing valves are reciprocable in cylinders 165 and 166 respectively, into which pressure liquid is alternately admitted at the end of each stroke of the main pistons, by a pilot valve 168, through pipes 169, 169. As shown in Fig. 6, pressure liquid is admitted to the pilot valve from the inlet 158 through passages 170 and 171 drilled in the valve housing.

In this form of the invention the pilot valve actuating mechanism, instead of being of the reciprocating plunger type as in Figs. 1 to 4, comprises rock shafts 175 journaled for oscillation about their axes in the valve body D and the central body A. As shown in Fig. 8, the shafts are made in two sections separable at the juncture of the valve body and the central body, one section being removable with the valve body. The rock shafts are adapted to be rocked by fingers 176 keyed to the lower ends thereof and engaged by sleeves 177 on the inner sides of the main pistons 130 and 131 at the inner end of piston travel. Levers 178 keyed to the upper ends of the rock shafts 175 engage the opposite ends of the stem of the pilot valve 168 whereby the pilot valve is shifted at the end of each stroke of the main pistons.

It will be recalled that the surge piston, in the form of the invention shown in Figs. 1 to 4, comprises only a single piston providing continuous flow of high pressure motive liquid and of discharge mud. In the form shown in Figs. 5 to 9, however, a double surge piston, operating on the same principle as the single surge piston of the first form, provides additionally for continuous flow of suction mud to the pump and of spent motive liquid from the pump.

Referring particularly to Fig. 6, a pair of surge cylinders 181 and 182 are secured in coaxial relation in the central body A, the axis of the cylinders being below that of the main cylinders and extending at right angles thereto. Surge pistons 183 and 184 in cylinders 181 and 182 are connected by a hollow piston rod 185, the piston assembly being secured together by a tie rod 186. The cylinders are separated by a central partition 187 through which the piston rod extends, a stuffing box 188 sealing the piston rod to the partition. The ends of the cylinders open into surge chambers 190 and 191 for discharge mud and suction mud, respectively, the chambers being closed at their outer ends by closure plates 192 and 193. Closure plate 193 is bored and threaded to receive a mud suction inlet pipe 194. A passage 195 leads from the mud discharge surge chamber 190 to the main discharge chamber 143. A steel pipe bumper 196 projecting from the outer side of piston 183 limits the stroke of the surge pistons by striking the closure plate 192.

As stated previously, four registering pairs of channels extend vertically within the central body A and the valve body D. Two pairs of these channels, 150, 152, and 151 and 153, as shown in Fig. 5, lead from the main reversing valve 155 to the main cylinders, as previously described. Disposed in planes at right angles to these channels are two additional pairs of registering channels 201, 203, and 202, 204, as shown in Fig. 6. Channels 201, 203 lead from the pressure liquid inlet 158 to the left-hand or high pressure, surge cylinder 181, and channels 202, 204 lead from the right-hand, or low pressure, surge cylinder 182 to the exhaust motive liquid outlet 159. By virtue of the arrangement described, the piston 183 is exposed on its outer side to the pressure of the discharge mud, and on its inner side to the pressure of the motive liquid which actuates the main pistons; and the cylinder 182 is in communication with the suction mud on the outer side of piston 184, and is in communication with the spent motive liquid on the inner side of piston 184.

As in the single surge piston of Figs. 1 to 4, the surge piston rod 185 is made of relatively large diameter in order that the ratio of piston area on the motive liquid side of piston 183 to the piston area on the discharge mud side thereof is less than the ratio of piston areas on corresponding sides of the main pistons 130 and 131. In this way, although the unit pressure of the motive liquid is higher than that of the discharge mud, the total force exerted by the mud on piston 183 exceeds that exerted by the motive liquid, and consequently during the stroke of the main pistons the surge pistons will be held retracted in the position shown in Fig. 6.

As the main pistons approach the end of their stroke and the pilot valve is tripped, the initial movement of the main valve immediately throttles the flow of pressure liquid to the main cylinder. This results in a slowing down of the main pistons and a reduction of pressure in both the motive liquid in the cylinder and the discharge mud. The motive liquid pressure exerted against the surge piston 183 remains constant, however, and when the discharge mud pressure decreases sufficiently to cause the total force exerted by to motive liquid on piston 183 to exceed that exerted by discharge mud, the surge pistons will be moved to the left in Fig. 6. During this movement of the surge pistons discharge mud will be forced out of chamber 190 to cause continuous flow of discharge mud, and pressure liquid will flow through channels 203 and 201 and into the surge chamber 181 on the right side of pistons 183, thereby preventing cessation of flow of pressure liquid while the main reversing valve is passing dead center. In addition, movement of piston 184 to the left draws suction mud into the chamber 191 and cylinder 182 on the right side of the piston to provide continuous flow of suction mud into the pump, and spent motive liquid is forced out of cylinder 182 on the left side of the piston and out through channels 202 and 204 to the outlet 159, thereby continuing the flow of spent motive liquid while the main pistons are momentarily at rest.

Figs. 10, 11 and 12 illustrate schematically three stages of operation of the surge pistons during reversal of the stroke of the main pistons. In Fig. 10 the main pistons are moving to the left and are approaching the end of the stroke. The pilot valve has been actuated to admit pressure liquid to the left shuttle cylinder to cause the main reversing valve to move to the right. In this figure the discharge mud pressure has not dropped sufficiently to move the surge piston. The surge pistons start moving, however, before the main pistons come to rest, so that the two sets of pistons pump cumulatively, the increasing displacement of the surge pistons supplementing the decreasing displacement of the main pistons. In Fig. 11 the main reversing valves are on dead center, the main pistons are temporarily at rest, and the surge pistons are moving to the left to continue the movement of the four liquids, which would otherwise be temporarily interrupted. In Fig. 12 the main reversing valves have moved to the right of dead center, admitting pressure liquid to the righthand main cylinder and exhausting spent liquid from the left-hand cylinder, causing the main pistons to move to the right. This causes the discharge mud pressure to return to normal, forcing the surge pistons to the right. During this phase, the right-hand main piston and the left-hand surge piston are pumping mud differentially—that is, the net displacement of discharge mud is that pumped by the main piston minus that drawn into the surge cylinder.

From the foregoing description, the mode of operation and the advantages of this form of the invention are believed to be apparent. The continuous flow of all four liquids is an outstanding feature of this invention; it will be appreciated that at the high pressures prevailing in pumping drilling mud it is essential to prevent interruption of the flow of motive liquid or of discharge mud, and it is also highly advantageous to provide continuous flow of suction mud and of spent motive liquid, especially in view of the high volume displacement.

Another important feature of this form of the invention is the provision of an outer cylinder surrounding each of the main cylinders. By this means, the pressures internally and externally of the main cylinders are substantially balanced, the maximum pressure differential being only that existing across the pistons. In the cylinder under high pressure, the discharge mud fills the annular passage between the inner and outer cylinders, so that outwardly of the piston the pressures exerted on the cylinder are balanced, while inwardly of the piston the inner pressure is the motive liquid pressure, and the outer pressure is the slightly lower discharge mud pressure.

This double-cylinder construction is made possible by placing all of the valves and inlets and outlet in the central body, a construction which of itself has many inherent advantages from a manufacturing and assembling standpoint.

It will be observed that in Figs. 1 to 4 the drop in discharge mud pressure is effected by providing dashpots which slow down the main pistons, while in Figs. 5 to 12 no dashpots are used—the pressure drop being effected by the throttling of the main valve and the consequent decrease in motive liquid pressure in the main cylinder. It will be understood that either of these arrangements may be employed interchangeably, neither being dependent on any of the other specific features of the form in which they are shown.

Figure 13:
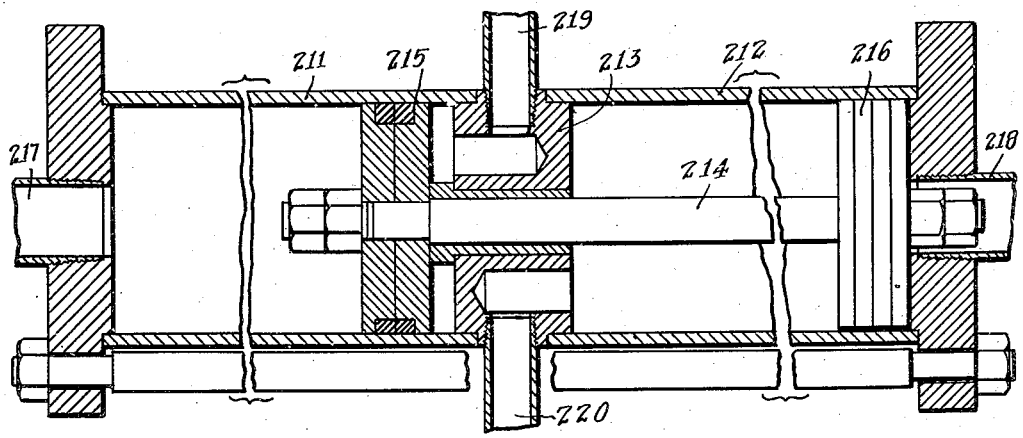
Fig. 13 is a central longitudinal section through a modified surge piston which may be used in lieu of that shown in Fig. 6.
Figure 14:
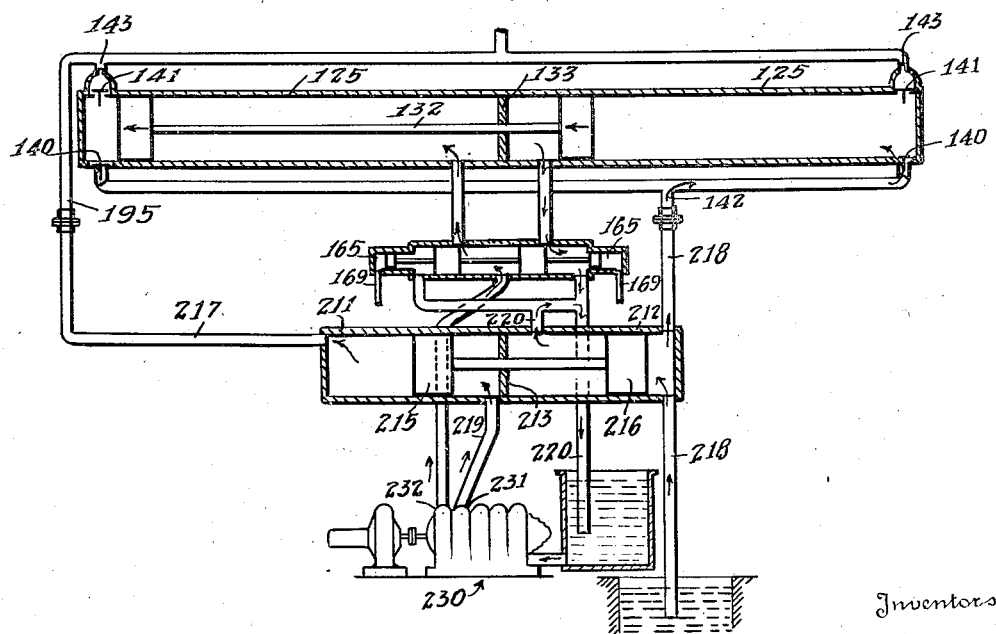
Fig. 14 illustrates diagrammatically one phase of operation of the surge piston of Fig. 13, the position of the parts corresponding to that shown in Fig. 10.

Referring now to Figs. 13 and 14, a double surge piston and cylinder arrangement is shown which may be employed as an alternative to that shown in Figs. 5 to 9. Whereas in the latter the surge piston is retained in retracted position during the stroke of the main pistons by excess mud pressure produced by the provision of a high differential piston area, in the form of Figs. 13 and 14 the same result is obtained by providing opposing piston areas of the same ratio as on the main pistons, but instead of employing the full motive liquid pressure to actuate the surge piston a liquid at slightly lower pressure is employed.

Referring to Fig. 13, the high and low pressure surge cylinders 211 and 212 are secured to and separated by a central partition 213 through which extends a piston rod 214 to the ends of which are secured the pistons 215 and 216. In this instance, the piston rod may be of substantially the same diameter with respect to the diameter of the pistons as in the main pistons. A mud discharge line 217 is connected to the outer end of cylinder 211, and a mud suction line 218 is connected to the outer end of cylinder 212. A pressure liquid inlet 219 communicates through passages in the partition 213 with the cylinder 211 on the inner side of piston 215, while a spent motive liquid conduit 220 communicates in a similar manner with the cylinder 212 on the inner side of piston 216. With this arrangement, if the full pressure of the motive liquid were admitted through inlet 219, the pistons would move to the left since the total force exerted by motive liquid on piston 215 would exceed that exerted by mud acting thereon. However, a motive liquid at slightly lower pressure than that acting on the main pistons is admitted through inlet 219, exerting a total force on piston 214 equal to the total force exerted in the form shown in Fig. 6.

As an example, in the form of the invention shown in Figs. 5 to 12 the relative piston areas require approximately 20% drop in mud discharge pressure before the surge pistons are moved. In other words, the total force exerted by the mud on the high pressure surge piston exceeds that exerted thereon by motive liquid, due to the high differential piston area. If a five-stage centrifugal pump 230 is employed to furnish the motive liquid, as illustrated schematically in Fig. 14, the surge piston 215 of Fig. 13 may be exposed to the pressure of the discharge from the fourth stage 231 of the centrifugal pump, which pressure is 20% below that of the fifth or final stage 232. In Fig. 14 the elements not specifically described correspond to those shown in Figs. 10, 11 and 12, and bear the same reference numerals.

The high differential piston area arrangement of Figs. 5 to 12, however, has one distinct advantage over the arrangement shown in Figs. 13 and 14. In the latter form, the unit mud pressure acting on piston 215 always exceeds the unit motive liquid pressure, and consequently if any leakage occurs across the piston it will be of mud into the clear motive liquid. The reverse condition, with slightly higher motive liquid pressure than mud pressure on both main pistons and surge pistons, characterizes the other two forms of the invention, and the advantages thereof are readily apparent if the pumped liquid is of an abrasive or other objectionable nature having a deleterious effect on pump parts.

It will be understood that the double surge cylinder and piston of Fig. 13 may be built into the central body of the pump as in Fig. 6; however, as shown in Fig. 13 it is constructed as a detachable unit capable of being applied to any pump of the type referred to herein. For instance, it may be connected to the pump shown in Figs. 1 to 4 in lieu of or in addition to the single surge piston arrangement shown therein.

It will be observed that in each of the three forms of the invention disclosed, the pressure across the pistons is substantially balanced, thereby eliminating one of the chief causes of wear in pumps of the type now in use. Lip-type rubber pistons may be used to obtain a practically perfect seal across the pistons, without the attendant enormous piston drag caused by high differential pressure. Pistons and cylinders may be made larger, resulting in a reduction in piston speed while maintaining adequate volume displacement. The substantially balanced pressure across the pistons results in the pistons merely functioning as a barrier between the motive liquid and the pumped liquid without changing the pressure-volume characteristics of the pump supplying the motive liquid. For this latter reason, it is possible to employ whatever type of power pump provides the desired pressure-volume characteristics, and to handle only clear liquid in such pump and transmit the pressure and volume displacement of the clear liquid to the pump liquid by means of our hydraulic pump. It will be apparent that a hydraulic pump of this character is well adapted to handle various kinds of liquids of an abrasive or other objectionable nature, such as drilling mud, cement slurry, etc. The interposition of the hydraulic pump between the pumped liquid and the power pump protects the latter from harmful effects of the liquid, but without modifying the operating characteristics of the power pump.

By the provision of a hydraulically actuated surge piston operated by the motive liquid, continuous flow of pumped liquid and also of motive liquid is made possible. The action is positive and controllable within desired limits, and requires only relatively short surge cylinders, as distinguished from an accumulator employing a compressible fluid as the opposing force. The operation of the surge pistons is automatic, requiring no timing or synchronizing mechanism, such as is the case in a duplex pump where the strokes of the pistons are overlapped to cause one piston to pump while the other is reversing its stroke. In a steam duplex pump with a variable cut-off the flow is necessarily uneven inasmuch as during a portion of each cycle both pistons are displacing mud whereas after cut-off of steam further piston travel as the result of expansion of the steam is not uniform. In a simplex pump with a surge piston according to our invention, however, the displacement of pumped fluid is substantially uniform.

Having fully described the preferred embodiments of this invention, it is to be understood that we do not limit ourselves to the exact construction set forth, which may obviously be varied in detail without departing from the spirit of this invention, but only as set forth in the appended claims.

We claim:

1. In a hydraulic pump, two cylinders each having a piston therein dividing it into a pump liquid compartment at one end and a motive liquid compartment at the other end, and means interconnecting said pistons for movement in unison, valve means for alternately applying motive liquid to the motive liquid compartments of said two cylinders to reciprocate said pistons, and valve means for exhausting spent motive liquid from said cylinders, valve means for admitting pump liquid to and discharging pump liquid from each cylinder in response to movement of the piston therein, and means comprising an auxiliary cylinder having a piston therein and actuated by said motive liquid only during reversal of the stroke of said first-mentioned pistons for continuing the intake of pump liquid during such reversal.

2. In a piston pump, a cylinder, a piston reciprocable therein, a chamber adjacent one end of said cylinder, a suction port and a discharge port in said chamber, an outer shell surrounding said cylinder in spaced relation thereto and forming therewith an annular passage between said cylinder and shell, a port in said cylinder adjacent the end thereof remote from said chamber, said port providing communication between said annular passage and the interior of said cylinder, and the other end of said annular passage communicating with said chamber.

3. In a hydraulic pump, a pair of cylinders, one end of one cylinder being contiguous to one end of the other, a piston in each cylinder, said pistons being interconnected, motive liquid valve means disposed adjacent contiguous ends of said cylinders, fluid connections for motive liquid from said valve means to said cylinders, an outer shell surrounding each cylinder in spaced relation thereto and forming an annular passage between each cylinder and shell, a port in each cylinder adjacent the end thereof remote from said valve means, said ports providing communication between the remote ends of said annular passages and the interiors of said cylinders, and a pump-liquid valve chamber disposed adjacent the contiguous ends of said cylinders, the contiguous ends of said annular passages communicating with said pump-liquid valve chamber.

4. The combination with a simplex hydraulically actuated piston pump having motive liquid inlet and outlet means and pump liquid inlet and discharge means and a source of motive liquid and a source of pump-liquid: of surge means operable during reversal of said pump for equalizing liquid flow, said surge means comprising a pair of auxiliary cylinders, interconnected auxiliary pistons in said auxiliary cylinders, and connections from said auxiliary cylinders to said pump-liquid discharge means, motive liquid source, and motive liquid outlet means.

5. In a hydraulic pump, a pair of main cylinders, a pair of interconnected main pistons reciprocable in said cylinders, suction and discharge connections to said pump, inlet and exhaust connections for motive liquid for reciprocating said pistons, a pair of surge cylinders, a pair of interconnected surge pistons reciprocable in said surge cylinders, said surge pistons being actuated during reversal of the stroke of said main pistons, one face of one piston being connected to said pump discharge, an oppositely directed face of one of the pistons being connected to said motive liquid inlet and the face of the other piston directed in the same direction as said first-mentioned face being connected to said motive liquid exhaust.

6. A hydraulic pump as defined in claim 5, in which the piston area on the motive liquid side of said surge piston is reduced relative to the piston area on the pump discharge side thereof, whereby the full discharge pressure retains said surge piston at the motive liquid end of its cylinder, and said surge piston moves only in response to a drop in discharge pressure.

7. A hydraulic pump as defined in claim 5, in which one end of the other of said surge pistons is connected to said pump suction, whereby the flow of suction liquid to said pump is continued during said reversal.

8. A hydraulic pump as defined in claim 5, in which the opposite end of said one surge cylinder is subjected to a predetermined pressure, lower than but having a definite relation to, the normal pressure of said pump discharge, whereby said surge pistons are actuated upon a predetermined drop in discharge pressure.

9. In combination: a mechanism employing fluid and having a fluid port in the underside thereof, a base member for said mechanism having fluid-conveying means therein terminating in a port in the upper face of said base, and means for resiliently supporting said mechanism from said base and effecting fluid connection between said ports comprising a member of resilient fluid-tight material interposed between said base and mechanism and having a passage registering with said ports.

10. In a simplex hydraulic pump, a pair of main cylinders, a pair of interconnected main pistons reciprocable in said cylinders, pump-liquid suction and discharge connections to said pump, inlet and exhaust connections for motive liquid for reciprocating said pistons, and surge means actuated in response to a drop in pump liquid discharge pressure for continuing the flow of pump discharge during reversal of the stroke of said main pistons, said surge means comprising an auxiliary cylinder having an auxiliary piston reciprocable therein, means subjecting one side of said auxiliary piston to a pressure lower than, but having a definite relation to, the normal pressure of said pump discharge, and the other side of said piston being in communication with said pump discharge connection whereby said auxiliary piston is actuated upon a predetermined drop in discharge pressure.

11. In a hydraulic piston pump, a central body, coaxially arranged main cylinders secured to opposite sides of said body, pistons reciprocable in said cylinders, means extending through said body and interconnecting said pistons to cause the latter to reciprocate in unison, motive liquid inlet and exhaust ports in said body communicating with said cylinders, and surge means operable during reversal of said pistons for equalizing liquid flow, said surge means comprising an auxiliary cylinder in said central body and a piston reciprocable therein.

12. A hydraulic piston pump comprising a central body, coaxially arranged main cylinders extending from opposite sides of said body, pistons reciprocable in said cylinders, means extending through said body and interconnecting the pistons for reciprocation in unison, an outer shell surrounding each cylinder in spaced relation thereto and forming therewith an annular passage communicating with the interior of the respective cylinder on the outer side of the piston therein, motive liquid valve means and pump liquid valve means in said central body, and motive liquid passages and pump liquid passages extending from their respective valve means through said central body to each of said cylinders, one group of said passages communicating directly with said cylinders on the inner side of the pistons therein, and the other group of passages communicating with said cylinders through said annular passages.

13. A hydraulic piston pump comprising a central body, coaxially arranged main cylinders secured to opposite sides of said body, pistons reciprocable in said cylinders, means extending through said body and interconnecting the pistons for reciprocation in unison, motive liquid valve means adjacent said central body, a motive liquid passage extending from said valve means through said central body to each of said cylinders, pump liquid suction and discharge valves in said central body, pump liquid passages extending from said last-named valves through said central body to the cylinders, an auxiliary cylinder in said central body, an auxiliary piston therein, a motive liquid passage extending through said central body to said auxiliary cylinder on one side of the piston therein, and a pump liquid passage extending through the central body to said auxiliary cylinder on the other side of the piston.

14. In a hydraulic pump, a pair of cylinders, a pair of interconnected pistons reciprocable therein, pump liquid suction and discharge connections to and from said pump, inlet and exhaust connections for motive liquid to and from said pump, valve means for alternately applying motive liquid under pressure to and releasing the same from oppositely directed piston faces to reciprocate said pistons, valve means for admitting pump liquid to and venting pump liquid from said pump in response to movement of said pistons, surge means operable in response to predetermined drop in the ratio of pump liquid discharge pressure to motive liquid pressure for continuing the discharge of pump liquid during reversal of the stroke of said pistons, and means independent of said motive liquid valve means for decreasing the ratio of pump liquid discharge pressure to motive liquid pressure near the end of the working stroke of each piston.

15. A hydraulic pump as set forth in claim 14, in which said last-named means comprises pairs of cooperating cup and plunger elements, one element of each pair being secured to each of said pistons and the other element of each pair being secured to each of said cylinders, whereby they interchange near the end of the working stroke of the respective pistons.

ALADAR HOLLANDER.
WALDEMAR F. MAYER.